STEREOPHONIC RECEIVER HAVING CROSSTALK COMPENSATION MEANS

Filed Jan. 3, 1964 2 Sheets-Sheet 1

INVENTORS
JOHN P. PIETROLEWICZ
ABRAM HOPENGARTEN
BY
Fordyce A. Bothwell
ATTORNEY

STEREOPHONIC RECEIVER HAVING CROSSTALK COMPENSATION MEANS

Filed Jan. 3, 1964 2 Sheets-Sheet 2

INVENTORS
JOHN P. PIETROLEWICZ
ABRAM HOPENGARTEN
BY Fordyce A. Bothwell
ATTORNEY United States Patent Office 3,309,464

Patented Mar. 14, 1967

3,309,464

STEREOPHONIC RECEIVER HAVING CROSS-TALK COMPENSATION MEANS

John P. Pietrolewicz, Pennsauken, N.J., and Abram Hopengarten, Lafayette Hills, Pa., assignors to Philco Corporation, Philadelphia, Pa., a corporation of Delaware Filed Jan. 3, 1964, Ser. No. 335,650

14 Claims. (Cl. 179—15)

This invention relates to stereophonic radio receivers adapted to receive the now-standard FM multiplex signal as well as a monophonic signal. More particularly, the invention relates to means for decoding or demodulating the received composite stereophonic signal by time division switching or sampling.

As is well known, the composite stereophonic signal which is transmitted on an FM carrier includes stereophonic component signals and a 19 kc. pilot carrier or phase reference signal. One way of decoding or demodulating the composite signal is by time division switching or sampling. For a description of the standard signal and the sampling method of demodulation, reference may be had to the book entitled, "FM Multiplexing For Stereo," by Leonard Feldman, Published in March 1962 by Howard W. Sams and Co., Inc. of Indianapolis, Indiana.

As described in said book, one form of demodulation apparatus comprises a balanced shunt diode switching bridge driven by a 19 kc. oscillator through a doubler circuit which provides a 38 kc. switching voltage for the bridge. This type of apparatus requires insertion of a correction signal to cancel cross-talk in the output channels. The inserted correction signal is simply a proper amount of the composite signal which is in opposite phase relation to the main signal so as to cancel the cross-talk. Heretofore the correction signal has been matrixed into the output channels of the switching bridge. When this is done by resistive matrixing means, an insertion loss of approximately 6 db is incurred in both the two stereo output signals and the correction signal. Other disadvantages of prior art switching bridges are that the 19 kc. oscillator must continue to run for monophonic reception as well as stereophonic reception, and it is difficult to provide visual indicator means to indicate stereophonic reception.

One object of the present invention is to overcome or eliminate these disadvantages.

Another object of the invention is to provide a demodulation apparatus which employs the balanced switching bridge but which does not have the disadvantages which have heretofore attended the use of such bridge.

Other objects and features of the invention will be apparent as the description proceeds.

Figure 1:
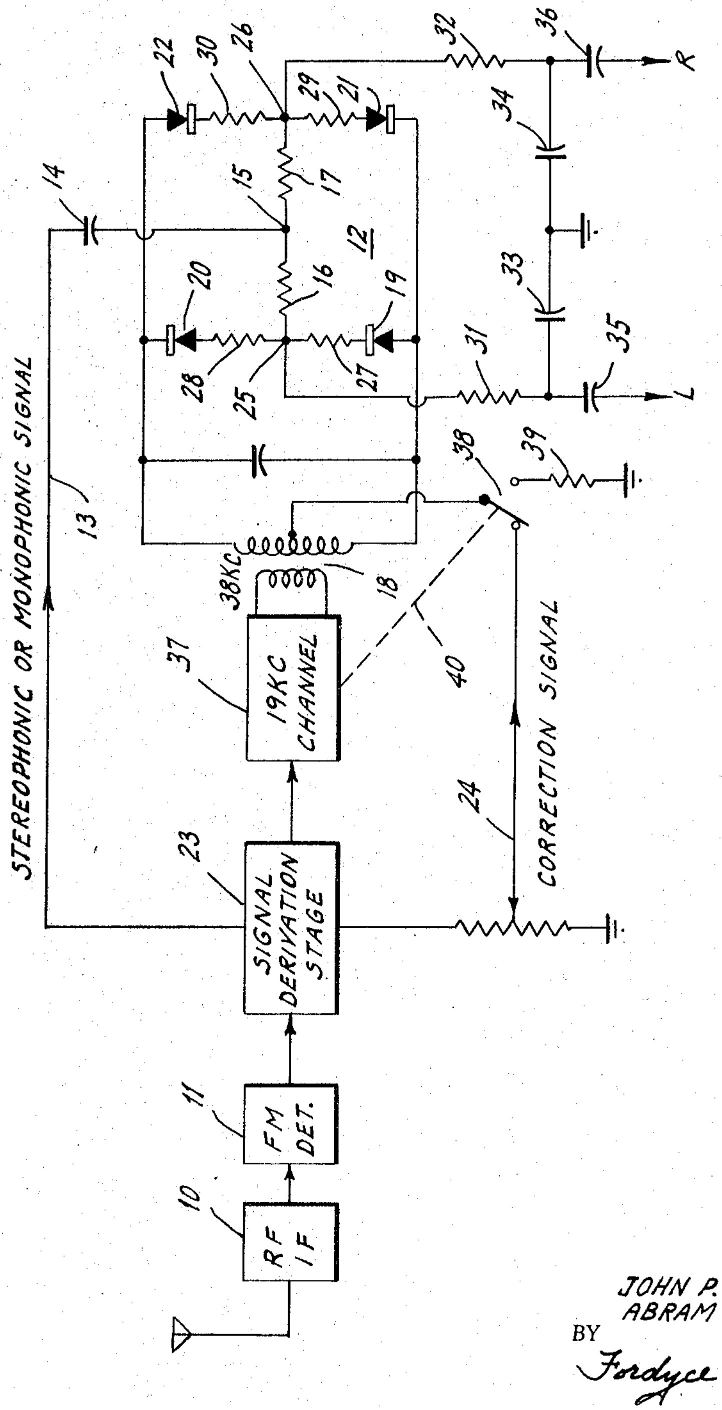
Figure 2:
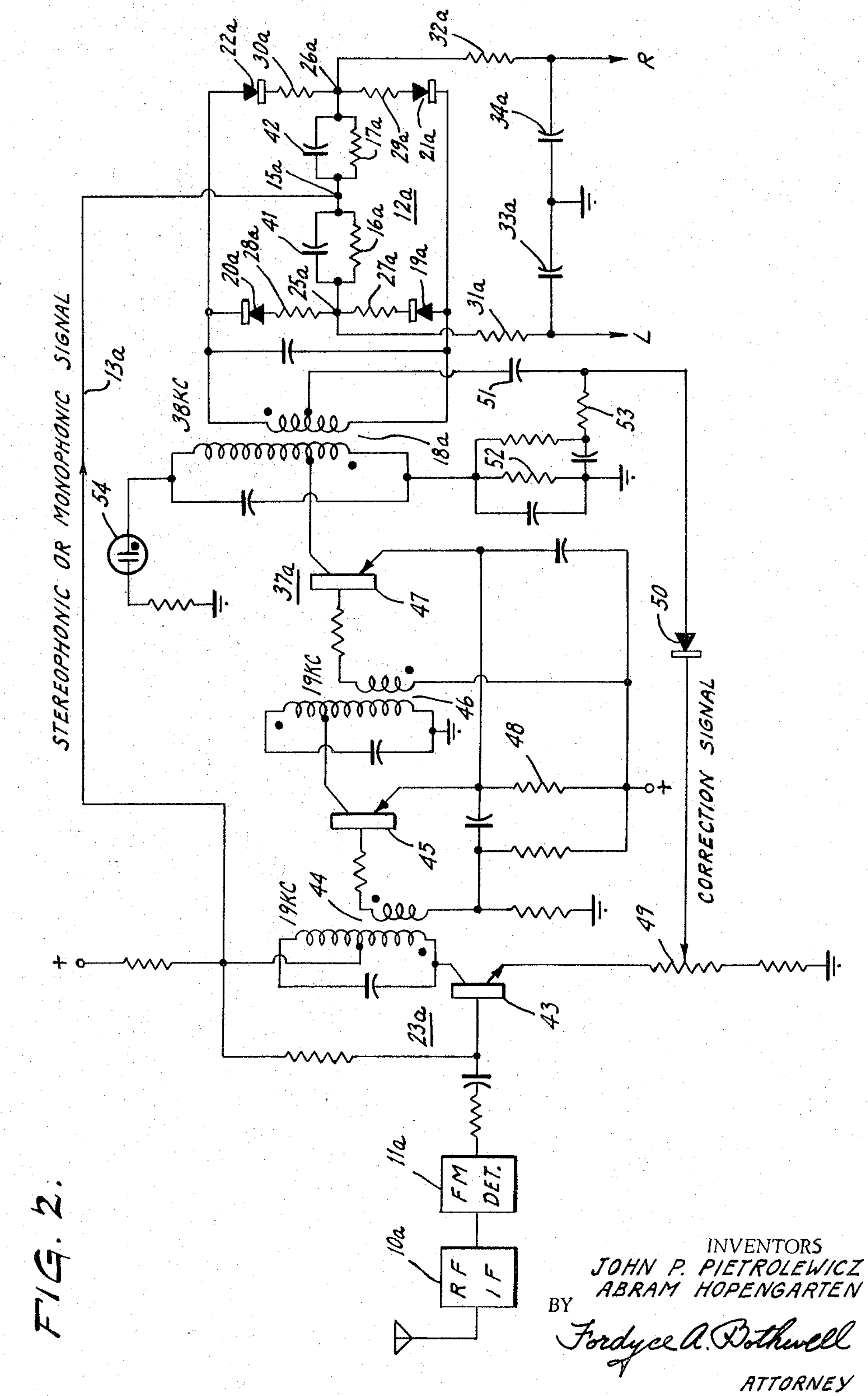

The invention may be fully understood from the following detailed description with reference to the accompanying drawings wherein FIG. 1 is a simplified illustration, partially in block diagram, of a radio receiver including one embodiment of the present invention; and FIG. 2 is a detailed schematic illustration of such a receiver as it has been successfully employed experimentally.

Referring first to FIG. 1, block 10 represents the conventional RF and IF stages and block 11 represents the conventional FM detector or discriminator stage of a receiver wherein either the composite sterophonic signal or a monophonic signal, transmitted by FM carrier, may be recovered and supplied at the output of the FM detector 11.

A known form of balanced switching bridge is shown at 12. The composite stereophonic signal to be decoded or demodulated is supplied over conductor 13 through capacitor 14 to the junction 15 of resistors 16 and 17. The 38 kc. switching voltage is applied in opposite phases to the bridge from the center-tapped secondary of transformer 18. In the prior art system the center tap is connected directly to ground. During one half cycle of the switching voltage, diodes 19 and 20 are rendered conductive while diodes 21 and 22 are rendered non-conductive. At such time the L channel is shunted to ground through the conductive diodes and the center tap, and a signal appears at the R output channel. During the next half cycle of the switching voltage, diodes 21 and 22 are rendered conductive while diodes 19 and 20 are rendered non-conductive. The R channel is shunted to ground through the conductive diodes, and a signal appears at the L output channel.

In this type of demodulation circuit, there tends to be cross-talk in the L and R channels, i.e. there tends to be a small amount of R signal in the L channel and a small amount of L signal in the R channel. Heretofore it has been the practice to inject a correction signal directly into the output channels. However when this is done by resistive matrixing means, a substantial insertion loss of up to 6 db is incurred as hereinbefore mentioned.

Also in this type of system, the 38 kc. switching voltage has heretofore been produced by employing a 19 kc. oscillator, phase locked by the incoming 19 kc. pilot signal, and means for doubling the frequency of the oscillator output. This has required that the oscillator operate during monophonic reception, as otherwise a monophonic signal, supplied over connection 13, would be shunted through the four diodes to ground and would not appear at either output channel. Since in the prior art system employing an oscillator a 38 kc. voltage appears across transformer 18 whether or not a 19 kc. signal is being received, it is impossible to differentiate between incoming stereophonic and monophonic signals by any means connected to transformer 18 or the switching bridge.

The above disadvantages are eliminated by the system provided by this invention. In this system, as shown generally in FIG. 1, the correction signal, derived from stage 23 as hereinafter described, is applied over connection 24 to the center tap of the secondary of transformer 18. When diodes 19 and 20 are conductive, the correction signal is applied through the conductive diodes to point 25 and thence to the L channel to cancel the cross-talk. Likewise when diodes 21 and 22 are conductive, the correction signal is applied through the conductive diodes to point 26 and thence to the R channel to cancel the cross-talk.

The injection of the correction signal is through two of the resistors 27 to 30 in parallel. In this bridge type circuit, each of said resistors 27 to 30 has a value (e.g. 3.9K) substantially less than the value (e.g. 56K) of resistors 16 and 17 and also substantially less than the value (e.g. 56K) of resistors 31 and 32. Hence the insertion loss is very low, and an improvement of approximately 6 db in output can be realized. Elements 31 to 36 are connected in a known form of two-channel output network in which resistors 31 and 32 are isolation resistors, capacitors 33 and 34 are de-emphasis capacitors, and capacitors 35 and 36 are coupling capacitors.

In addition to low insertion loss, the arrangement according to this invention has the additional advantage that the correction signal cannot significantly attenuate the desired signal. Thus when the correction signal is applied to point 25 it cannot significantly attenuate the signal in the R channel, and when the correction signal is applied to point 26 it cannot significantly attenuate the signal in the L channel.

The system provided by this invention is further characterized in that the 19 kc. channel 37 does not employ an oscillator but simply amplifies and doubles the frequency of the 19 kc. pilot signal, and provision is made to render the bridge circuit operative to transfer monophonic signals without the necessity for presence of the 38 kc. switching voltage. This latter feature involves an effective switching operation, and it is represented in FIG. 1 by switch 38 and resistor 39. Switch 38 is controlled from the 19 kc. channel as indicated by the broken line 40. In the absence of the 19 kc. pilot signal, i.e. during monophonic reception, the switching action effectively connects the center tap of the secondary of transformer 18 to resistor 39. The monophonic signal, supplied over connection 13, appears across a load impedance comprising two of the resistors 27 to 30 in parallel and resistor 39. The attenuation by the bridge circuit is determined primarily by the value of resistor 39 which may be made relatively large (e.g. 8.2K) to minimize the attenuation. In actual practice the switching action is effected by means of a switching diode as hereinafter described with reference to FIG. 2.

From the foregoing description it will be seen that the present invention provides a system wherein the required correction signal is injected with low insertion loss by way of the center tap of the transformer, and the bridge circuit is made operative to transfer a monophonic signal without the necessity of an oscillator. This enables utilization of the 38 kc. voltage to operate a visual indicator, such as a neon lamp, as hereinafter described.

Referring now to FIG. 2, there is shown a system according to this invention which has been successfully employed experimentally. The elements corresponding to FIG. 1 are designated by the same reference characters with the suffix *a*.

The bridge circuit 12*a* is the same as bridge circuit 12 in FIG. 1 except for the addition of capacitors 41 and 42 which were found to be effective to correct phase errors in the derived stereophonic signals. As in FIG. 1, the composite signal is applied to point 15*a*.

The 19 kc. signal is derived in stage 23*a* to which the output of the FM detector 11*a* is supplied. Stage 23*a* comprises transistor 43 and tuned transformer 44 through which the 19 kc. signal is derived and supplied to an amplifier stage comprising transistor 45 and tuned transformer 46. The next stage comprising transistor 47 and transformer 18*a* is a Class C operated double-amplifier whose quiescent (zero signal) emitter current is zero. AGC is provided by degenerative feedback from the last stage to the preceding stage through resistor 48.

The correction signal is derived from potentiometer 49 and is supplied through diode 50 and capacitor 51 to the center tap of the secondary transformer 18*a*. During stereophonic reception when the doubler-amplifier stage is in operation, a D.C. voltage is developed across resistor 52 in the collector circuit of transistor 47, and this voltage serves to turn on diode 50. Thus during stereophonic reception when the 19 kc. pilot signal is present, the diode 50 is conductive and the correction signal is supplied to the bridge circuit as previously described. However, during monophonic reception when the 19 kc. pilot signal is not present, there is no D.C. voltage across resistor 52, and the diode 50 is not turned on. The monophonic signal is transferred by the bridge circuit with minimum attenuation determined primarily by resistor 53 which corresponds to resistor 39 in FIG. 1.

In this system it is possible to employ a neon lamp 54 connected so as to be energized by the amplified 38 kc. signal, for example connected to the primary of transformer 18*a* as shown, so as to serve as a monophonic-stereophonic signal indicator.

Thus it will be seen that the present invention provides an improved demodulation system of the switching bridge type which eliminates the disadvantages of the prior art system.

While a preferred embodiment of the invention has been described, it will be understood that the invention is not limited thereto but contemplates such modifications and further embodiments as may occur to those skilled in the art.

We claim:

1. In a radio receiver adapted to receive a composite stereophonic signal including a phase reference signal and stereophonic signals capable of being derived by sampling of said composite signal under control of said phase reference signal, a sampling bridge circuit, means for supplying said composite signal to said circuit, means responsive to said phase reference signal and including a transformer having a center-tapped secondary winding connected to said circuit for supplying sampling voltages thereto, stereo output channels extending from said circuit in which there tends to be undesired cross-talk, means for deriving a cross-talk correction signal from said composite signal, and means for supplying said correction signal to the center-tap of said winding and thence to said circuit to cancel the undesired cross-talk.

2. In a radio receiver adapted to receive a composite stereophonic signal including a phase reference signal and stereophonic signals capable of being derived by sampling of said composite signal at a frequency which is a multiple of the frequency of said phase reference signal, a sampling bridge circuit, means for supplying said composite signal to said circuit, means for deriving said phase reference signal, means responsive to said phase reference signal and including a transformer having a center-tapped secondary winding connected to said circuit for supplying thereto sampling voltages of said multiple frequency, stereo output channels extending from said circuit in which there tends to be undesired cross-talk, means for deriving a cross-talk correction signal from said composite signal, and means for supplying said correction signal to the center-tap of said winding and thence to said circuit to cancel the undesired cross-talk.

3. In a radio receiver adapted to receive a composite stereophonic signal including a 19 kc. phase reference signal and stereophonic signals capable of being derived by sampling of said composite signal at a 38 kc. rate, a sampling bridge circuit, means for supplying said composite signal to said circuit, means for deriving said 19 kc. signal, means responsive to said 19 kc. signal and including a transformer having a center-tapped secondary winding connected to said circuit for supplying 38 kc. sampling voltages thereto, stereo output channels extending from said circuit in which there tends to be undesired cross-talk, means for deriving a cross-talk correction signal from said composite signal, and means for supplying said correction signal to the center-tap of said winding and thence to said circuit to cancel the undesired cross-talk.

4. In a radio receiver adapted to receive either a monophonic signal or a composite stereophonic signal including a phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, means responsive to said phase reference signal and including a transformer having a center-tapped secondary winding connected to said circuit for supplying sampling voltages thereto only during stereophonic reception, means for supplying a cross-talk correction signal to the center-tap of said winding during stereophonic reception, and means connected to said center-tap for rendering said circuit operative to transfer said monophonic signal in the absence of said sampling voltages.

5. In a radio receiver adapted to receive either a monophonic signal or a composite stereophonic signal including a phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, means responsive to said phase reference signal and including a transformer having a center-tapped secondary winding connected to said circuit for supplying sampling voltages thereto only during stereophonic reception, means including a diode for supplying a cross-talk correction signal to the center-tap of said winding during stereophonic reception, means for rendering said diode conductive only during stereophonic reception, and means effective during monophonic reception to render said circuit operative to transfer said monophonic signal in the absence of said sampling voltages.

6. In a radio receiver adapted to receive either a monophonic signal or a composite stereophonic signal including a phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, means responsive to said phase reference signal and including a transformer having a center-tapped secondary winding connected to said circuit for supplying sampling voltages thereto only during stereophonic reception, means including a diode for supplying a cross-talk correction signal to the center-tap of said winding during stereophonic reception, means operable in response to said phase reference signal to render said diode conductive only during stereophonic reception, and means effective during monophonic reception to render said circuit operative to transfer said monophonic signal in the absence of said sampling voltages.

7. In a radio receiver adapted to receive either a monophonic signal or a composite stereophonic signal including a 19 kc. phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, a signal derivation stage to which said composite signal is supplied, means for deriving said 19 kc. signal from said stage and for doubling its frequency to provide 38 kc. sampling voltages, said last means including a transformer having a center-tapped secondary winding, means connecting the ends of said winding to said circuit, means operative during stereophonic reception for deriving a cross-talk correction signal from said stage and for supplying it to the center-tap of said winding, and means connected to said center-tap effective during monophonic reception to render said circuit operative to transfer said monophonic signal in the absence of said sampling voltages.

8. In a radio receiver adapted to receive either a monophonic signal or a composite stereophonic signal including a 19 kc. phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, a signal derivation stage to which said composite signal is supplied, means for deriving said 19 kc. signal from said stage and for doubling its frequency to provide 38 kc. sampling voltages, said last means including a transformer having a center-tapped secondary winding, means connecting the ends of said winding to said circuit, means for deriving a cross-talk correction signal from said stage, means including a diode for supplying said correction signal to the center-tap of said winding, means for rendering said diode conductive only during sterephonic reception, and means effective during monophonic reception to render said circuit operative to transfer said monophonic signal in the absence of said sampling voltages.

9. In a radio receiver adapted to receive either a monophonic signal or a composite stereophonic signal including a 19 kc. phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, a signal derivation stage to which said composite signal is supplied, means for deriving said 19 kc. signal from said stage and for doubling its frequency to provide 38 kc. sampling voltages, said last means including a transformer having a center-tapped secondary winding, means connecting the ends of said winding to said circuit, means operative during stereophonic reception for deriving a cross-talk correction signal from said stage and for supplying it to the center-tap of said winding, visual indicator means connected to said transformer for indicating stereophonic reception, and means connected to said center-tap effective during monophonic reception to render said circuit operative to transfer said monophonic signal in the absence of said sampling voltages.

10. In a radio receiver adapted to receive either a monophonic signal or a composite stereophonic signal including a 19 kc. phase reference signal and stereophonic signals capable of being derived by sampling of said composite signal under control of said phase reference signal, a bridge circuit for demodulation of said composite stereophonic signal and for transfer of said monophonic signal, means for supplying either of the latter signals to said circuit, a signal derivation stage to which said composite signal is supplied, means for deriving said 19 kc. signal from said stage and for doubling its frequency to provide 38 kc. sampling voltages, said last means including a transformer having a center-tapped secondary winding, means connecting the ends of said winding to said circuit, means for deriving a cross-talk correction signal from said stage, means including a diode for supplying said correction signal to the center-tap of said winding, means for rendering said diode conductive only during stereophonic reception, visual indicator means connected to said transformer for indicating stereophonic reception, and means effective during monophonic reception to render said circuit operative to transfer said monophonic signal in the absence of said sampling voltages.

11. In a radio receiver adapted to receive either a monophonic signal or a composite stereophonic signal including a 19 kc. phase reference signal and stereophonic signals capable of being derived by sampling of said composite signal under control of said phase reference signal, a bridge circuit for demodulation of said composite stereophonic signal and for transfer of said monophonic signal, means for supplping either of the latter signals to said circuit, a signal derivation stage to which said composite signal is supplied, means for deriving said 19 kc. signal from said stage and for doubling its frequency to provide 38 kc. sampling voltages, said last means including a transistor having a collector circuit and also including a transformer connected to said collector circuit and having a center-tapped secondary winding, means connecting the ends of said winding to said bridge circuit, means for deriving a cross-talk correction signal from said stage, means including a diode for supplying said correction signal to the center-tap of said winding, means in said collector circuit for producing a D.C. voltage, means for applying the latter voltage to said diode to render it conductive only during stereophonic reception, and means for rendering said bridge circuit operative to transfer said monophonic signal in the absence of said sampling voltages.

12. In a radio receiver adapted to receive a composite stereophonic signal including a phase reference signal and stereophonic signals capable of being derived by sampling of said composite signal under control of said phase reference signal, a sampling circuit, means for supplying said composite signal to said circuit, means including connections to said circuit for supplying sampling voltages thereto under control of said phase reference signal, stereo output channels extending from said circuit in which there tends to be undesired cross-talk, means for deriving a cross-talk correction signal from said composite signal, and means for supplying said correction signal to said circuit via said connections to cancel the undesired cross-talk.

13. In a radio receiver adapted to receive either a monophonic signal or a composite stereophonic signal including a phase reference signal and stereophonic signals capable of being derived by sampling of said composite signal under control of said phase reference signal, a sampling circuit, means for supplying said composite signal to said circuit, means for supplying sampling voltages to said circuit under control of said phase reference signal, stereo output channels extending from said circuit in which there tends to be undesired cross-talk during stereophonic reception, means including a diode for supplying a cross-talk correction signal to said circuit during stereophonic reception, means for rendering said diode conductive only during stereophonic reception, and means effective during monophonic reception to render said circuit operative to transfer said monophonic signal in the absence of said sampling voltages.

14. In a radio receiver adapted to receive either a monophonic signal or a stereophonic signal including component signals capable of being derived by sampling of the stereophonic signal, a bridge circuit for demodulation of said stereophonic signal and for transfer of said monophonic signal, said bridge circuit having first and second pairs of terminals, first impedance means comprising a tap and interconnecting said first pair of terminals, means coupled to said tap for supplying either one of said stereophonic signal and said monophonic signal to said tap, second impedance means also comprising a tap and interconnecting said second pair of terminals, means for supplying sampling voltages to said second impedance means only during reception of said stereophonic signal by said receiver, and means coupled to said tap of said second impedance means for rendering said circuit operative to transfer said monophonic signal in the absence of said sampling voltages.

References Cited by the Examiner

UNITED STATES PATENTS

| | | | |
|---|---|---|---|
| 3,070,662 | 12/1962 | Eilers | 179—15 |
| 3,167,615 | 1/1965 | Wilhelm et al. | 179—15 |
| 3,225,143 | 12/1965 | Parker | 179—15 |
| 3,226,481 | 12/1965 | Wilson et al. | 179—15 |

DAVID G. REDINBAUGH, *Primary Examiner.*

ROBERT L. GRIFFIN, *Examiner.*